J. A. WHERRY.
COLLATED WORK SHEETS.
APPLICATION FILED JULY 21, 1921.

1,424,967.

Patented Aug. 8, 1922.
2 SHEETS—SHEET 1.

J. A. WHERRY.
COLLATED WORK SHEETS.
APPLICATION FILED JULY 21, 1921.

1,424,967.

Patented Aug. 8, 1922.

Inventor.
John A. Wherry
By Chas. J. O'Neill
Atty

UNITED STATES PATENT OFFICE.

JOHN A. WHERRY, OF NEW ORLEANS, LOUISIANA.

COLLATED WORK SHEETS.

1,424,967. Specification of Letters Patent. Patented Aug. 8, 1922.

Application filed July 21, 1921. Serial No. 486,363.

*To all whom it may concern:*

Be it known, that I, JOHN A. WHERRY, a citizen of the United States, residing at 5911 Prytania Street, New Orleans, in the parish of Orleans and State of Louisiana, have invented certain new and useful Improvements in Collated Work Sheets; and I do hereby declare the following to be a full, clear, and exact description of the invention, such as will enable others skilled in the art to which it appertains to make and use the same.

The invention relates to means for grouping or collating work sheets, such as ledger sheets and statements preparatory to applying the data to be recorded thereon on a typewriting machine and has for its object to materially simplify the operation of assembling the sheets in proper relation and to ensure the accurate alignment of the corresponding portions of the main work sheet and the supplementary work sheet to receive the typewritten data; as for example, the complete record of transactions inscribed on a ledger sheet and extending over a relatively long interval of time and the corresponding data for a fractional portion of the time represented by the ledger sheet record, inscribed on the statement sheet, the application of the record being simultaneously made on both sheets. To this end the invention comprises a primary or ledger sheet printed in the usual form with columns for various entries, said sheet having a column of figures along one side corresponding with the line spaces of the typewriting machine and having one of its ends provided with means to receive the folded end of the supplementary sheet and to prevent lateral displacement of the latter, and a supplementary sheet provided with similar columns to receive corresponding data, said sheet having an extended end provided with lines spaced to correspond with the line spacing on the primary sheet and numbered in reverse order, said extended end being adapted to be folded or creased along a predetermined line and to be engaged with the end of the primary sheet so that the data may be properly applied to both sheets simultaneously, the original impression of the typewriting machine being applied to either of the sheets and transferred to the subjacent sheet by an interposed carbon sheet, preferably means provided for permanently locking the carbon sheet to the primary sheet.

The invention is illustrated in the accompanying drawings, in which:—

Fig. 1 is a face view of the series of sheets constructed and assembled in accordance with the invention;

Fig. 2 is a vertical section elevation of the assembled sheets;

Fig. 3 is a view similar to that shown in Fig. 1 illustrating a modification of the invention.

Referring to Figs. 1 and 2, 1 indicates the primary work sheet which is represented as a standard ledger sheet having the usual heading and columns and spaces for the reception of data such as is usually inscribed upon a record sheet of this character and exemplified as date, items, debits, credits, new balance, old balance. At one side of the date column there is applied a column 2 of consecutive numbers, representing lines spaced in accordance with the lined spacing of the typewriting machine.

The top edge of the sheet 1 is provided with a notch 4, preferably rectangular in shape and of length equal to the width of the supplementary work sheet to be used in conjunction with the primary sheet, said supplementary sheet being either in the form of a bill or statement when the primary sheet is a ledger sheet.

Located below the notch 4 and parallel therewith is a kerf or slot 3 formed in the body of the primary sheet to afford means for locking a carbon transfer sheet to the primary sheet, which locking operation is effected by slipping one end of the carbon sheet through the slot of the primary work sheet from the rear carrying it up over the lower edge of the notch 4 and turning the free edge of the carbon sheet down against the back of the work sheet and then folding the body of the carbon sheet over the face of the primary work sheet with the transfer side of the carbon sheet in contact with the face of the work sheet. The supplementary work sheet 7, as indicated, is of sufficient width to snugly fit the notch 4 in the top of the primary work sheet 1 and said sheet 7 is provided with a similar heading and columns and spaces substantially agreeing with those on the primary work sheet, as indicated. The upper end of the sheet 7 is provided with an extension having applied thereto a series of parallel lines 8 numbered consecutively, which are spaced apart at intervals equal to those between the figures in column 2 on the left-hand side of the sheet 1, the consecutive numbers on the end of the sheet 7 being in reverse order to the numbers in the column 2. The sheet 7 may be folded or creased along any of the numbered lines on the extended end thereof and engaged with sheet 1 by slipping the creased or folded end over the upper edge of the sheet 1 so that the creased edge of said sheet 7 will occupy notch 4 in sheet 1 and be prevented from lateral displacement on said sheet, so that the two sheets when thus assembled, with the interposed carbon, may be placed in a typewriter for the purpose of inscribing the data on both sheets, or may be assembled as an entirety and placed in a suitable file for subsequent use. As indicated, the assembled or collated sheets are employed for making records of commercial transactions such as will be recorded on ledger sheets, statements or bills. The ledger sheet constitutes the permanent record and the statement sheet is an index or record of transactions for a given period of time, say, as for example, a month, while the bill may represent one or more instant transactions of which a record is made immediately and delivered to the purchaser. Obviously instead of a single supplementary sheet, such as a statement being employed, duplicate or multiple copies may be made at one time including all or any portion of the transactions recorded on the main sheet, as for example, a monthly statement may be applied to the ledger sheet as indicated, and a bill covering one or more instant transactions may be superimposed in the proper relation on the statement so that the record of the instant transactions will be inscribed on all three sheets simultaneously, it being understood that the bill sheet will be properly adjusted and applied to the other sheets with a transfer sheet interposed between the bill and the statement.

As illustrated, the invention is applied to the collating of a ledger sheet and a statement, the latter indicating transactions made after the fourth transaction recorded on the ledger sheet, so that the first transaction to be indicated on the first line of the statement sheet should be recorded on the fifth line of the ledger sheet. In order to effect the proper registry of the lines on the ledger and statement sheet respectively, the latter is folded along the fifth of the reversely numbered lines 8 on the extended end of said statement sheet and the creased or folded end engaged with the notch 4 of the ledger sheet 1, as shown. This will bring the first record line of the statement sheet below the balance item in registry with the fifth line on the ledger sheet, which is the proper line of the ledger sheet to receive the next entry. The collated sheets are then placed in the typewriter and the records made in due course, the original appearing on the statement sheet and the carbon copy on the ledger. All subsequent data may be similarly inscribed on both sheets until the time interval represented by the statement sheet has expired when a new statement sheet is substituted for the completed statement, in which event said new statement sheet will be folded on the particular line of the series 8 of the extended end thereof representing the next line of the ledger sheet to receive a record. For example, should the first statement be completed when the eighteenth line of the ledger sheet has been inscribed, the new statement sheet would be folded along the nineteenth of the lines numbered 8 and applied to the ledger sheet by slipping the folded end over the notched end of the ledger sheet as described, which will bring the first line of the new statement sheet in registry with the nineteenth line of the ledger sheet.

This series of operations may be repeated as often as necessary until the ledger sheet has been completely filled, and if the latter is printed on both sides the operations are merely repeated, as will be understood, and it will also be apparent that the statement sheet may be applied to record any or all of the transactions recorded on the ledger sheet and may, as hereinbefore indicated, be used in conjunction with bills or sales slips which are made out at the time of the particular transaction or transactions.

Instead of applying the notch which receives and substantially locks the supplementary or statement sheet to the ledger sheet, at the upper edge of the latter, a similar notch such as 4' may be applied to the bottom of the ledger sheet as illustrated in Fig. 3. In such case, however, the statement sheet will be supplied with a column of lines or spaces numbered consecutively extending from its bottom and in reverse order to the numbering of the lines and spaces represented by the columns 2 on one or both sides of the ledger sheet 1. As indicated, the statement sheet has two such columns of reversely arranged figures designated by 10 10 or one on each edge of the sheet, the numbers running from one to fifty. In other respects the statement and ledger sheets are substantially the same as those illustrated in Fig. 1. In operating this particular modification of the invention, the statement sheet is folded along a line passing through a particular number on the statement sheet corresponding to the next line on the ledger sheet to receive the record. As indicated, the ledger sheet has four entries made thereon so that the next line to be written is the fifth. Therefore the statement sheet will be folded along line number 5 and engaged at the crease or fold with the notch 4' in the bottom of the ledger sheet. The carbon sheet may be slipped in place between the sheets 1 and 7 and the collated sheets placed in the typewriter and the several instant transactions recorded on both sheets, as in the preceding case. Should the ledger sheet contain fourteen recorded transactions when a new statement sheet is applied thereto, the latter will be folded along line number 15 thereon and engaged at the fold or crease at the notch 4' which will bring the first printing line of the statement into registry with the fifteenth line of the ledger sheet.

From the foregoing it will be apparent that the carbon sheet and the ledger sheet may be securely locked together for permanent use, and that the engagement of the statement sheet with the ledger sheet, by means of the creased or folded end of the latter engaging the notched edge of the former will afford a sufficiently substantial interlock between the sheets to permit them to be handled readily without disarrangement of the respective sheets and will enable them to be filed together, if such is found to be desirable.

What I claim is:

1. The combination of a main work sheet having a notch in one transverse edge thereof, and a supplementary work sheet adapted to be folded over or creased along any one of several lines and engaged at the crease or fold with the edge of the main sheet within said notch.

2. The combination of a main work sheet having a notch in one transverse edge thereof, and a supplementary work sheet having a width substantially equal to the length of said notch and adapted to be folded over or creased along any one of several lines and engaged at the crease or fold with the edge of the main sheet within said notch.

3. The combination of a main work sheet having a notch in one transverse edge thereof and a slot parallel with and adjacent said notch, a carbon sheet folded over the bottom of said notch and interlocking with said slot, and a supplementary work sheet adapted to be folded over or creased along any one of several lines and engaged at the crease or fold with the edge of the main sheet within said notch.

4. The combination of a main work sheet having a notch in one transverse edge thereof and a column of figures indicating line spaces along one side, and a supplementary work sheet having one end provided with a series of lines numbered in reverse order to the column of figures aforesaid, said work sheet adapted to be folded or creased along a predetermined line and engaged at the crease or fold with the notch in the main sheet.

5. The combination of a main work sheet having a notch in the transverse edge thereof and a column of figures indicating line spaces along one side, and a supplementary work sheet having a series of lines on one end numbered in reverse order to the column of figures aforesaid and spaced at equal intervals with said figures, said supplementary work sheet being adapted to be folded or creased along a predetermined line and engaged at the crease or fold with the notch in the main sheet.

6. The combination of a main work sheet having a notch in the transverse edge thereof and a column of figures indicating line spaces along one side, and a supplementary work sheet having a series of lines on one end numbered in reverse order to the column of figures aforesaid and spaced at equal intervals with said figures, said supplmentary work sheet being adapted to be folded or creased along a predetermined line and engaged at the crease or fold with the notch in the main sheet, said main sheet having means thereon for cooperating with the supplementary sheet to prevent lateral displacement of the latter.

In testimony whereof I affix my signature.

JOHN A. WHERRY.